(12) United States Patent
Viikari et al.

(10) Patent No.: US 9,043,992 B2
(45) Date of Patent: Jun. 2, 2015

(54) METHOD AND SYSTEM FOR OBJECT LOCALIZATION

(75) Inventors: Ville Viikari, Espoo (FI); Heikki Seppä, Espoo (FI); Kaj Nummila, Espoo (FI); Timo Varpula, Espoo (FI)

(73) Assignee: Teknologian Tutkimuskeskus VTT (FI)

( * ) Notice: Subject to any disclaimer, the term of this patent is extended or adjusted under 35 U.S.C. 154(b) by 485 days.

(21) Appl. No.: 13/502,740

(22) PCT Filed: Oct. 19, 2010

(86) PCT No.: PCT/FI2010/050814
§ 371 (c)(1),
(2), (4) Date: Aug. 23, 2012

(87) PCT Pub. No.: WO2011/048267
PCT Pub. Date: Apr. 28, 2011

(65) Prior Publication Data
US 2012/0306683 A1    Dec. 6, 2012

(30) Foreign Application Priority Data

Oct. 20, 2009    (FI) .................................... 20096076

(51) Int. Cl.
*G01S 13/74* (2006.01)
*A01K 11/00* (2006.01)
*G01S 5/30* (2006.01)
*G01S 11/16* (2006.01)
*G01S 13/75* (2006.01)

(52) U.S. Cl.
CPC ................. *A01K 11/006* (2013.01); *G01S 5/30* (2013.01); *G01S 11/16* (2013.01); *G01S 13/756* (2013.01)

(58) Field of Classification Search
CPC ......... A01K 11/006; G01S 5/30; G01S 11/16; G01S 13/756
USPC ....................................................... 342/42–51
See application file for complete search history.

(56) References Cited

U.S. PATENT DOCUMENTS

| 4,075,632 A | 2/1978 | Baldwin et al. |
| 6,054,925 A * | 4/2000 | Proctor et al. ............. 340/572.7 |
| 6,369,710 B1 | 4/2002 | Poticny et al. |
| 6,470,002 B1 | 10/2002 | Jones et al. |

(Continued)

FOREIGN PATENT DOCUMENTS

WO    WO2011/048267 A1    4/2011

OTHER PUBLICATIONS

Colpitts, B.G. "Harmonic radar transceiver design: Miniature tags for insect tracking". IEEE Trans. Ant. and Prog. Nov. 2004, vol. 52, No. 11 pp. 2825-2832.

(Continued)

*Primary Examiner* — Timothy A Brainard

(57) ABSTRACT

This document describes a method and system for object localization. In accordance with the method an object (1) is illuminated by at least one first type of signal, and response of the signal is detected. In accordance with the invention the object (1) equipped with a transponder (2, 3) backscattering the first type of signal, the transponder (2, 3) is illuminated also by a second type of signal affecting to the backscattering frequency of the transponder (2, 3), and the backscattered signal from the transponder (2, 3) is detected in order to localize the object.

17 Claims, 6 Drawing Sheets

(56) References Cited

U.S. PATENT DOCUMENTS

| | | | |
|---|---|---|---|
| 6,766,141 | B1 | 7/2004 | Briles et al. |
| 2005/0190098 | A1* | 9/2005 | Bridgelall et al. ............ 342/118 |
| 2006/0164248 | A1 | 7/2006 | Vossiek |
| 2008/0174436 | A1* | 7/2008 | Landt et al. ................ 340/572.7 |
| 2009/0278661 | A1* | 11/2009 | Harrington .................. 340/10.1 |
| 2009/0278662 | A1* | 11/2009 | Sanchez et al. ............. 340/10.1 |
| 2010/0036717 | A1* | 2/2010 | Trest ........................... 705/14.1 |

OTHER PUBLICATIONS

Vossiek et al. "An ultrasonic multielement sensor system for position invariant object identification". IEEE 1994 Ultrasonic Symposium, Nov. 1-4, 1994, vol. 2, pp. 1293-1297.

Vossiek et al. "Wireless local positioning". IEEE Microwave Magazine. Dec. 2003. vol. 4, Iss. 4, pp. 77-86.

* cited by examiner

METHOD AND SYSTEM FOR OBJECT LOCALIZATION

TECHNICAL FIELD

The present invention relates generally to object localization and tracking. Especially the invention relates to localization and tracking of small objects like insects.

BACKGROUND ART

Harmonic radars are used for insect localization and tracking.

The traditional harmonic radar is not found suitable for insect tracking indoors due to the high transmit power required, mechanical scanning and limited accuracy.

Also RFID-technology is used for insect localization and tracking. This technology requires active tags and these are heavy and therefore not suitable for small insects.

With passive RFID tags the problem is short reading distance.

Accurate tracking of insect movements in real time is an important tool for scientist studying the behaviour of different species. It has been previously developed a tracking system based on UHF RFID technology.

Several remote sensing and telemetric insect tracking techniques have been developed for demands of biological and agricultural studies. Remote sensing techniques do not require any physical interaction with the target whereas the insect is equipped with a transponder in telemetric techniques. A review of the techniques can be found in [1].

The remote sensing techniques used include for example radar, video graphic and other optical techniques, X-ray imaging, and passive and active acoustical techniques. Due to heavy cluttering of radar signal from ground and vegetation, the radar can only be used to track flying insects or insect swarms.

Optical remote sensing techniques are typically based on video camera and pattern recognition software that automatically identifies the target and calculates its location. Three-dimensional tracking necessitates a 3D ranging video camera or stereo vision camera. In addition to visible wavelengths video graphic techniques are also realized at infrared and thermal wavelengths, which provide night vision. Drawbacks of video graphic techniques are relatively small observation volume, unreliable pattern (and thus insect) detection, and technical challenges with ranging and stereo vision cameras.

Insect movement has also been monitored with photo detectors. The simplest systems illuminate a certain volume and measure either transmitted or scattered light, which changes in the presence of an insect. A more sophisticated technique is able to detect insect wing beat from the scattered light.

Acoustic techniques can be divided into active and passive ones. Active techniques use sodar (SOund Detection And Ranging), which shares the operation principle of radar but utilizes acoustic waves instead of electromagnetic waves. Sodars can only detect flying or moving insects. Passive acoustic tracking techniques record the sound produced by the tracked insect with spatially distributed microphones and solves for the location of insect by correlating the sound recorded in different locations.

Remote sensing techniques do not require physical contact to the insect and they do not therefore affect the insect behaviour. However, as compared to telemetric techniques remote sensing ones usually suffer from short detection range and unreliable target identification.

Telemetric techniques include radio frequency identification (RFID) and harmonic radar. In RFID, the tracked insects are equipped with a passive RFID tag or active transponder. Passive tags are smaller than the active ones but provide shorter range and lower tracking accuracy. An advantage of the RFID tracking principle over almost all other tracking techniques is that it can be used to track and identify multiple targets simultaneously.

The harmonic radar concept is based on harmonic radar and a transponder that generates radar reflections at a harmonic frequency when illuminated by a radar signal. An advantage of harmonic radar over conventional radar is that it is able to track small radar targets that are close to cluttering objects, such as ground or vegetation.

DISCLOSURE OF INVENTION

Therefore, it is an object of the present invention to provide a new method and device for object localization and tracking.

The invention is based using typically light weight transponders based on ultrasound or light detection and microwave backscattering positioned on the objects. The transponders attached to the objects are illuminated by microwaves and either by ultrasound or light and the backscattered microwave signal is detected.

The technique in accordance with the invention utilizes a wireless ultrasound microphone that is used as a microwave transponder. Ultrasound pulses are used to measure the distance from the target to several spatially diverse ultrasound loudspeakers.

Also photodetector with suitable antenna may be used as a transponder.

Considerable advantages are gained with the aid of the invention.

As compared to the existing harmonic radar and RFID-based insect tracking methods, both techniques could provide superior performance for insect tracking indoor or outdoor cages.

The invention provides precise (millimeters accuracy) insect localization in indoor arenas and cages, and this can be implemented with a relatively simple system. The invention also provides lightweight transponders.

The invention has also several other embodiments providing associated advantages.

BRIEF DESCRIPTION OF DRAWINGS

For a more complete understanding of the present invention and the advantages thereof, the invention is now described with the aid of the examples and with reference to the following drawings, in which.

BEST MODE FOR CARRYING OUT THE INVENTION

In the following, the theory and examples in accordance with the invention are discussed more thoroughly.

Combined Ultrasound and Microwave Tracking

This Section considers an insect tracking technique that is based on a microwave transponder that is activated with ultrasound. The applicant of this application has developed ultrasound MEMS devices and has several inventions that could be useful in implementing the described system.

Tracking Principle

Figure 1:
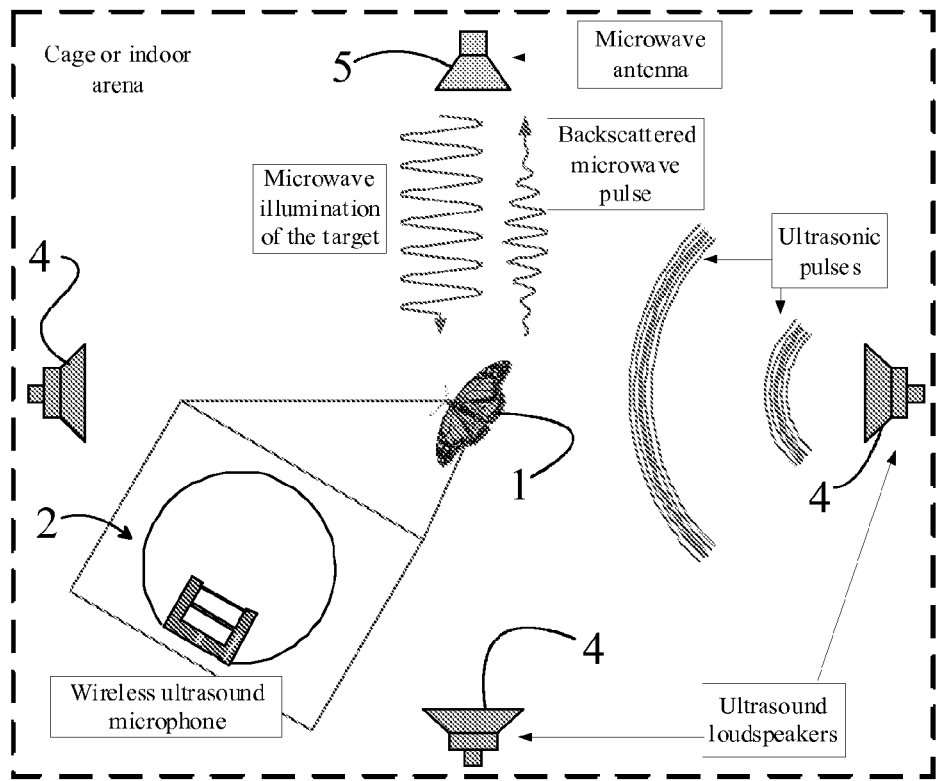
FIG. 1 presents a situation where insects are equipped with wireless ultrasound microphones in accordance with the invention which are used for tracking.

The tracking concept is presented in FIG. 1. The tracked insects 1 are equipped with tiny ultrasound microphones 2 which are used to measure the travelling time of an ultrasonic pulse from a loudspeaker 4 to the microphone 2. The physical travelling distance of the ultrasonic pulse is related to the travelling time and the known acoustical velocity in air. The target 2 is located by measuring its distance from three different loudspeakers 4 at known locations. The target (tag) is simultaneously illuminated with microwave radiation which is modulated in the tag by illuminating the tag also by the ultrasound signal. The modulated microwave signal is reflected back to the microwave antenna 5. Since the microwave propagates at the speed of light which is many orders of magnitude larger than that of ultrasound, the arrival time of the modulated microwave signal can be used to calculate the distance of the target from the known position of the loudspeaker. The loudspeakers 4 can be identified by using different modulation.

Ultrasound Microphone Element

Figure 2:
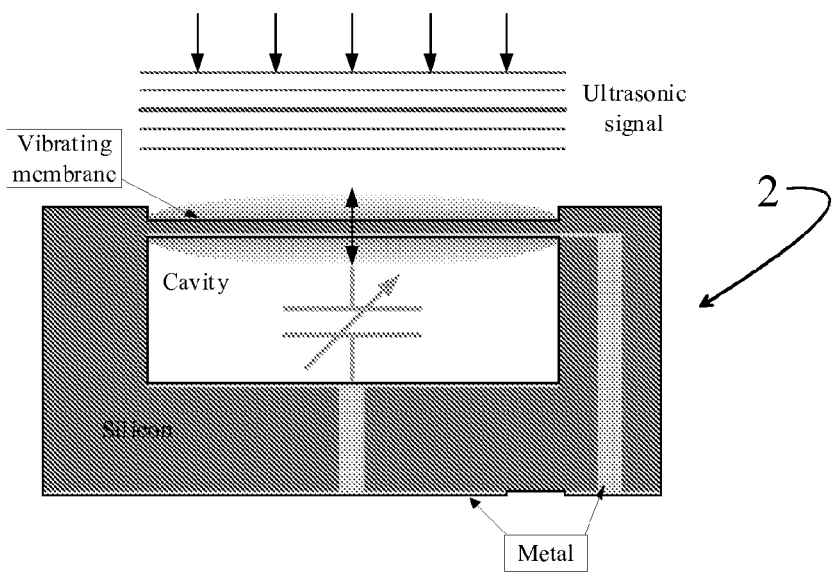
FIG. 2 presents a schematic layout of typical capacitive MEMS microphone. The electrical equivalent circuit of the microphone can be expressed as a variable capacitor (gray)

The wireless ultrasound microphone element 2 could be similar to the existing capacitive MEMS microphones, which are widely used for example in mobile phones. A schematic layout of a capacitive MEMS microphone is depicted in FIG. 2.

The MEMS microphone consists of a vibrating membrane supported by solid walls and backed by a cavity. The membrane is electrically conductive and it forms one electrode of the parallel plate capacitor. The other electrode of the capacitor is fixed and it is on the bottom of the cavity. The sound pressure displaces the membrane and changes its capacitance.

Figure 3:
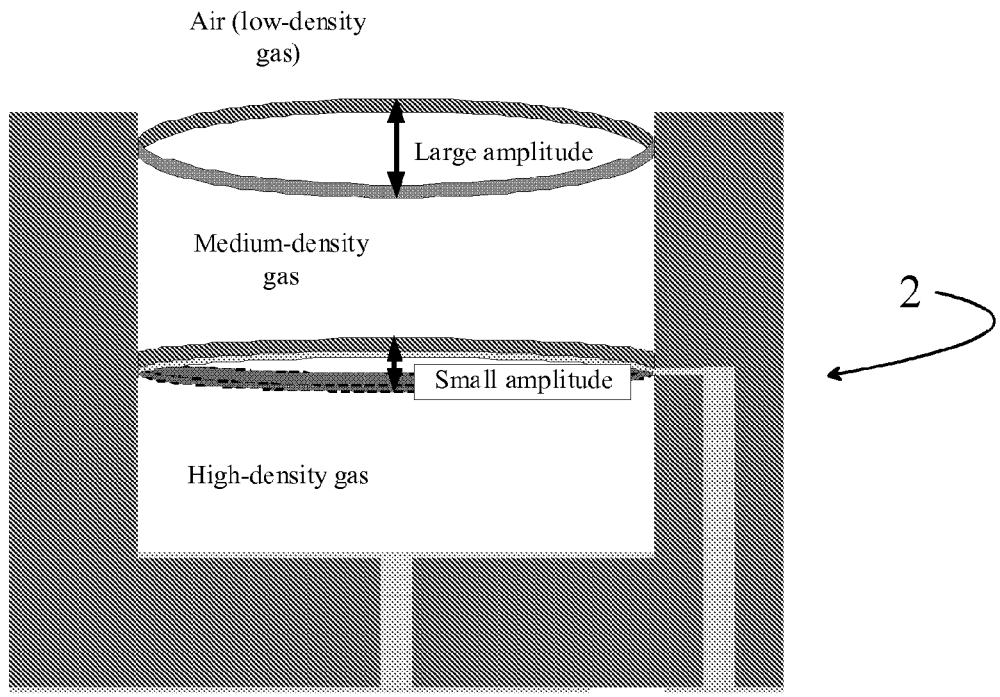
FIG. 3 presents principle of the mechanically matched ultrasound microphone.

A drawback with the capacitive MEMS microphones is that the acoustic wave does not couple effectively to the vibrating membrane. The coupling could be improved by using a mechanical matching technique that is based on using two or more cavities instead of one. An example of a matched ultrasound microphone is depicted in FIG. 3.

The upper cavity is filled with medium-density gas, such that the sound pressure causes relatively large amplitude to the vibrating membrane. The upper oscillating membrane causes an ultrasound oscillation in the upper cavity. This oscillation then actuates the lower membrane. The lower cavity is filled with a dense gas and the amplitude of the lower membrane is smaller than that of the upper one. This structure improves the ultrasonic coupling to the microphone at the expense of the microphone bandwidth.

We assume that a micro machined ultrasound microphone similar to that presented in FIG. 2 could be as small as 1 by 1 by 1 mm and could weigh less than 2 mg.

Theoretical Electro-Acoustic Response of the Wireless Microphone

Dynamic Response of the Membrane

The dynamic response of the ultrasound microphone membrane is given as $$m\frac{d^2}{dt^2}x + \eta\frac{d}{dt}x + kx = F, \quad (3.1)$$

where m is the effective mass of the cantilever, x is the cantilever displacement, η is the damping coefficient, k is the effective spring constant and F is the external force affecting the cantilever. When the membrane is actuated at its mechanical resonance frequency, the amplitude of the vibration is given as $$\hat{x} = \frac{\hat{F}_\omega Q_m}{k} = \frac{\hat{F}_\omega Q_m}{\omega_m^2 m}, \quad (3.2)$$

where $\hat{F}_\omega$ is the amplitude of the harmonic force, $Q_m = \omega_m m/\eta$ is the mechanical quality factor of the resonating membrane, and $\omega_m$ is the mechanical resonance frequency of the membrane. The force due to acoustical pressure is given as F=pA, where p is the acoustical pressure and A is the effective area of the membrane. Substituting this into (3.2) gives $$\hat{x} = \frac{\hat{p}AQ_m}{\omega_m^2 m}. \quad (3.3)$$

The peak sound pressure at a distance $r_{ac}$ from the acoustic source is given as $$\hat{p} = \sqrt{\frac{P_{ac}Z_{ac}}{2\pi r_{ac}^2}}, \quad (3.4)$$

where $p_{ac}$ is the acoustic power of the source and the acoustic impedance of air is $Z_{ac} = c_{ac}\rho_{air}$ where $c_{ac} \approx 330$ m/s is the speed of sound and $\rho_{air}$ is the density of air.

Electromagnetic Modulation Efficiency

Figure 4:
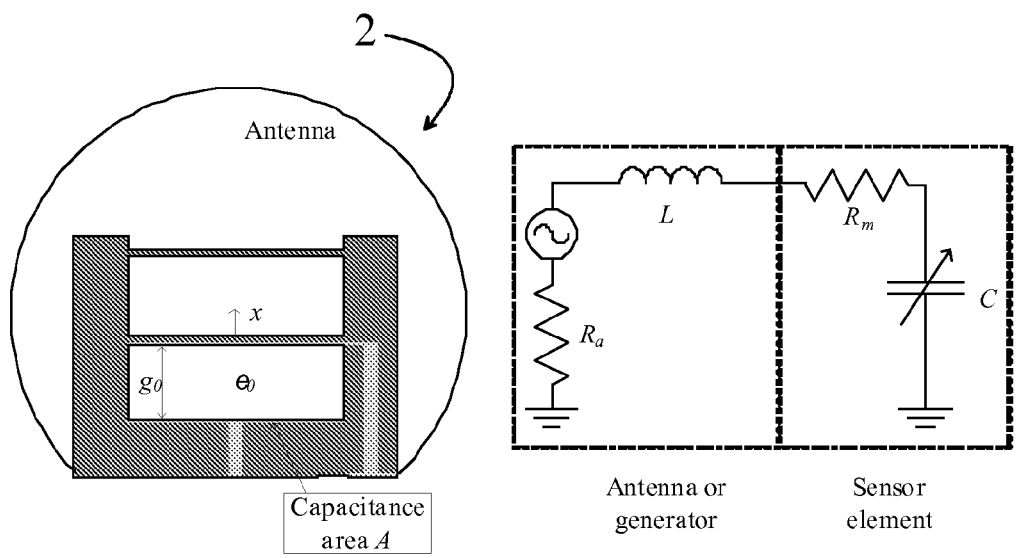
FIG. 4 presents a schematic layout of the wireless ultrasound microphone (left) and its electrical equivalent circuit (right)

The wireless ultrasound sensor consists of an antenna that is electrically matched to the sensor element. A schematic layout of the wireless sensor with its equivalent electrical circuit is shown in FIG. 4.

The equivalent capacitance of the ultrasound microphone is (assuming a parallel plate capacitor and small displacement)

$$C = \varepsilon_0 \frac{A}{g_0+x} \approx C_0\left(1-\frac{x}{g_0}\right), \quad (3.5)$$

where $\varepsilon_0$ is the permittivity of vacuum, A is the capacitor surface area, $g_0$ is the initial gap (and $C_0$ is the initial capacitance), and x is the displacement of the membrane. The wireless sensor is illuminated with a microwave signal and the antenna receives a power $P_{r,transp}$ producing a peak voltage of $\hat{V}_r = 2\sqrt{2P_{r,transp}R_a}$, where $R_a$ is the resistance of the antenna. Assume that the ultrasound actuates the membrane that oscillates as $x(t)=\hat{x}\sin\omega_{ac}t$, where $\hat{x}$ is the peak amplitude and $\omega_{ac}$ is the angular frequency of the ultrasound. Assuming conjugate matching between the antenna and the microphone ($R_a=R_m$ and $\omega_{rf}L=1/(\omega_{rf}C_0)$), the modulated voltage over the antenna resistance, that is the radiated voltage, is $$V_{mod} \approx 2\sqrt{2P_{r,transp}R_a}\frac{\hat{x}}{g_0R_a\omega_{rf}C_0}\sin[(\omega_{rf}-\omega_{ac})t]. \quad (3.6)$$

The corresponding power is $$P_{mod} = \frac{\hat{V}_{mod}^2}{2R_a} = \frac{4P_{r,transp}\hat{x}^2}{g_0^2R_a^2\omega_{rf}^2C_0^2}. \quad (3.7)$$

The ratio between the modulated and the received power, that is, the conversion efficiency is $$E = \frac{P_{mod}}{P_{r,transp}} = \frac{4\hat{x}^2}{g_0^2R_a^2\omega_{rf}^2C_0^2}. \quad (3.8)$$

Substituting (3.4) and (3.7) into (3.8) gives $$E = \frac{4A^2Q_m^2P_{ac}Z_{ac}}{2\pi r_{ac}^2 g_0^2 R_a^2\omega_{rf}^2 C_0^2\omega_{ac}^4 m^2} = \frac{2Q_m^2 P_{ac}Z_{ac}}{\pi r_{ac}^2 \varepsilon_0^2 R_a^2 \omega_{rf}^2 \omega_{ac}^4 m^2}. \quad (3.9)$$

Electromagnetic Detection Distance

The transponder is continuously illuminated electromagnetically by the reader device. The received power by the transponder is given as $$P_{r,transp} = P_{t,reader}G_{reader}G_{transp}\left(\frac{\lambda_{rf}}{4\pi r_{rf}}\right)^2, \quad (3.10)$$

where $P_{t,reader}$ reader is the transmitted power by the reader device, $G_{reader}$ is the gain of the reader antenna, $G_{transp}$ is the gain of the transponder antenna, $\lambda_{rf}$ is the electromagnetic wavelength, and $r_{rf}$ is the distance between the reader and the transponder. The transponder modulates the received signal and scatters it back to the reader. The received power by the reader is $$P_{r,reader} = P_{t,reader}G_{reader}^2G_{transp}^2\left(\frac{\lambda_{rf}}{4\pi r_{rf}}\right)^4 E, \quad (3.11)$$

where E is the modulation or conversion efficiency of the transponder. Solving (3.11) for the detection distance gives $$r_{rf} = \frac{\lambda_{rf}}{4\pi}\sqrt[4]{\frac{P_{t,reader}G_{reader}^2G_{transp}^2 E}{P_{r,reader}}}. \quad (3.12)$$

Substituting (3.9) into (3.12) gives $$r_{rf} = \frac{\lambda_{rf}}{4\pi}\sqrt[4]{\frac{2P_{t,reader}G_{reader}^2G_{transp}^2 P_{ac}Z_{ac}Q_m^2}{\pi P_{r,reader}R_a^2\omega_{rf}^2\varepsilon_0^2\omega_{ac}^4 m^2 r_{ac}^2}}. \quad (3.13)$$

Tracking Resolution and Speed

The distance resolution of the tracking system is proportional to the physical length of the ultrasound pulse given as $$dl = v_a\tau, \quad (3.14)$$

where $v_a \approx 330$ m/s is the acoustic velocity in air and $\tau$ is the duration of the pulse. As a rule of thumb, the pulse duration is the inverse of the signal bandwidth B. Thus, the distance resolution can be given as $$dl = \frac{v_a}{B} = \frac{v_a f_{ac}}{Q_m}. \quad (3.15)$$

For example, the distance resolution is approximately 3 cm with 10 kHz bandwidth. The distance measurement accuracy may be better than that depending on the signal-to-noise ratio.

The pulse repetition frequency is limited by the largest distance between a loudspeaker and the target L as $$f_r \leq \frac{v_a}{L}. \quad (3.16)$$

The tracking measurement frequency is further limited by the number of loudspeakers N and is given as $$f_p = \frac{v_a}{NL}. \quad (3.17)$$

For example, the position refreshment rate is 1 Hz (one measurement/second) when the largest measurement distance is L=33 m and the number of loudspeakers is N=10.

Identification of Multiple Targets

Multiple targets can be identified using acoustical frequency division, electromagnetic frequency division or both. The electromagnetic frequency division is realized by using a narrowband matching between the antenna and the microphone element. The acoustic frequency division is realized by dimensioning the microphone elements such that each has different resonance frequency. Frequency division may require several reader systems and may thus be laborious to implement.

Assuming that there are three different electromagnetic frequency bands and three acoustical bands, it is possible to simultaneously track and identify 9 transponders.

Estimation of Realizable Performance

Let us estimate the realizable tracking range. Assume that the ultrasound frequency is 40 kHz and that the sound power of the ultrasound source is 1 mW. A device with similar performance can be found in [23]. The acoustic impedance of air is 410 Ns/m².

Figure 5A:
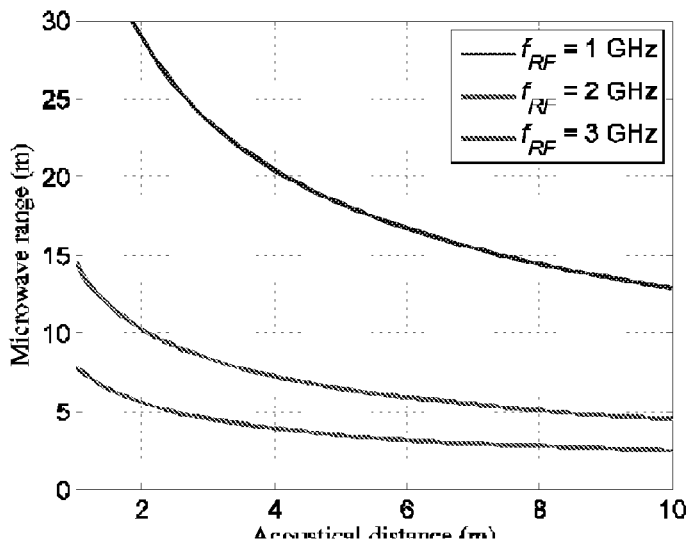
FIG. 5a presents as graph estimated microwave conversion efficiency of the ultrasound transponder as a function of the acoustical distance.
Figure 5B:
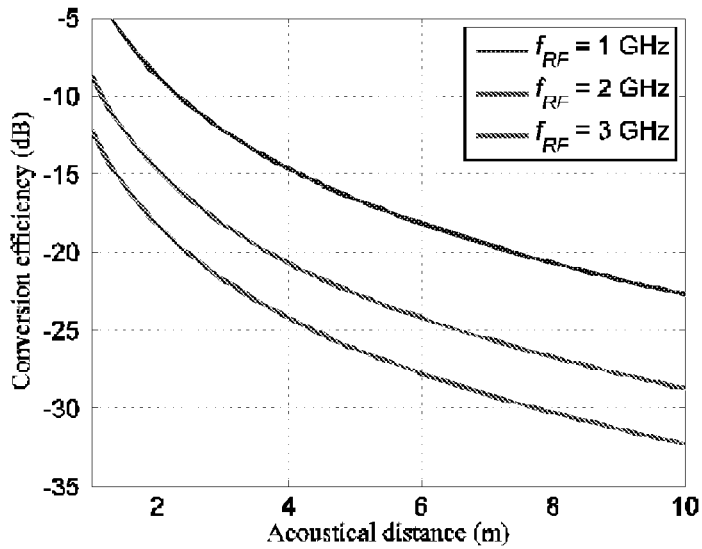
FIG. 5b presents as graph estimated microwave detection range of the ultrasound transponder as a function of the acoustical distance.

The sound wavelength in air at 40 kHz is 8 mm. The membrane surface area of the microphone is 400 by 400 micrometers and the gap is 200 μm. The membrane thickness is 1 μm and its effective mass is 0.3 μg. The initial capacitance of the microphone element is $C_0 = \epsilon_o A/g_0 = 14$ fF. Let us further assume that the electrical quality factor of the microphone is 100 at 5 GHz resulting in a series resistance of 22Ω. The estimated parameters of the ultrasound tracking system are shown in Table I. The electrical modulation efficiency of the transponder as a function of $r_{ac}$ is shown in FIG. 5a. FIG. 5b shows the microwave detection range of the transponder as a function of the ultrasound range. For example, if the acoustical distance is 6 m and the microwave frequency is 2 GHz, the transponder can be detected from 6 m distance.

TABLE I

Estimated parameters of the ultrasound tracking system.

| | |
|---|---|
| Acoustic frequency | $f_{ac} = \omega_{ac}/(2\pi) = 40$ kHz |
| Acoustic power | $P_{ac} = 1$ mW |
| Transmitted RF-Power | $P_{t, reader} = 30$ dBm |
| Acoustic impedance | $Z_{ac} = 410$ Ns/m³ |
| Effective mass of the membrane | $m = 0.3$ μg |
| Reader antenna gain | $G_{reader} = 6$ dBi |
| Transponder antenna gain | $G_{transp} = -10$ dBi |
| Threshold level of the reader | $P_{r, reader} = -110$ dBm |
| Antenna resistance | $R_a = 22$ Ω |
| Electrical frequency | $f_{rf} = \omega_{rf}/(2\pi) = 1, 2, 3$ GHz |
| Permittivity of vacuum | $\epsilon_0 = 8.854 \cdot 10^{-12}$ F/m |
| Mechanical quality factor | $Q_m = 20$ |

Tracking with Scanning Laser and Microwave Transponder

This Section considers a photo diode based transponder system for insect tracking. In accordance with FIGS. 6a and 6b the insect 1 is equipped with a photo sensitive transponder 3 which is activated with scanning lasers 14, which illuminate the insect and the transponder 3. The laser signal is modulated and causes modulated backscatter at microwave frequencies when it illuminates the transponder 3.

Figures 6A, 6B:
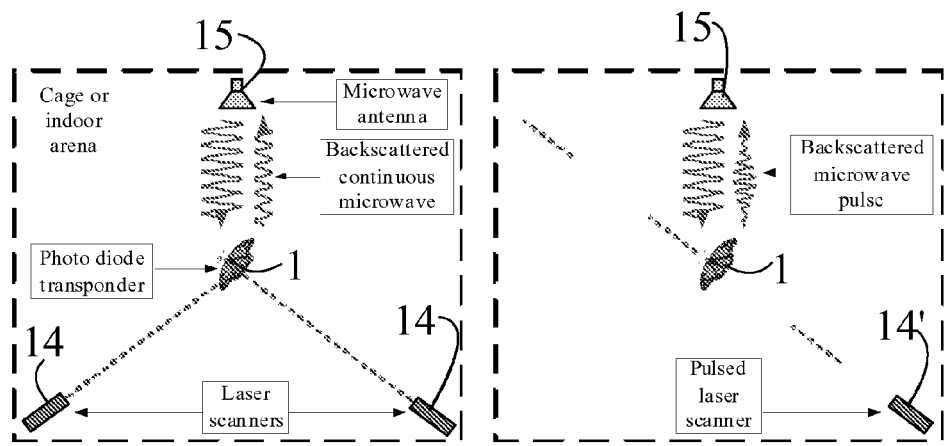
FIG. 6a presents schematically tracking principle in accordance with the invention, which is based on continuously scanning laser and photo diode transponder. The laser signal can be continuous (left figure) or pulsed (right figure).
FIG. 6b presents schematically tracking principle in accordance with the invention, which is based on pulsed scanning laser and photo diode transponder.

The modulated laser signal can be either pulsed (FIG. 6b) or continuous (FIG. 6a). If a continuous signal is used, the target location is the intersection point of at least two laser beams at the moment the modulated microwave signal is detected. If a pulsed radar signal is used, the target distance can be solved from the time delay and a single laser beam is sufficient. Both continuous and pulsed radar tracking principles are shown in FIG. 6a (continuous) and FIG. 6b (pulsed).

Photovoltaic Response of the Transponder

Figure 7:
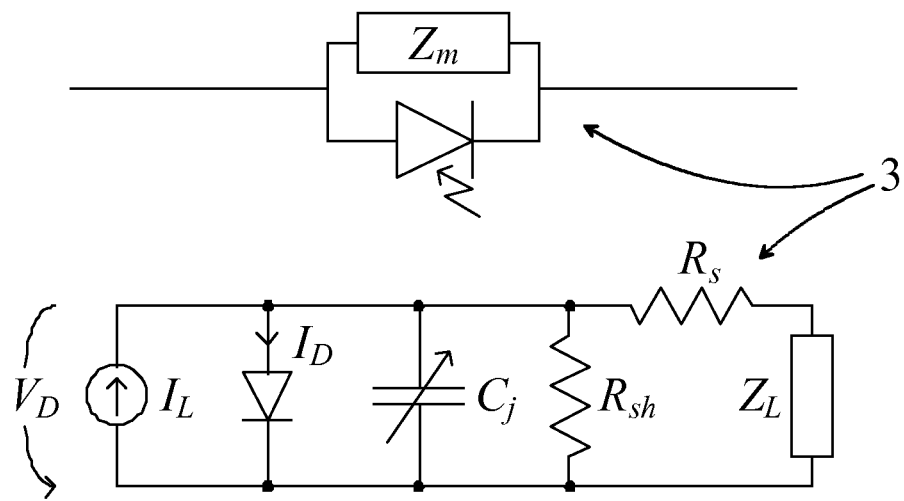
FIG. 7 presents schematic layout of the photo diode based microwave transponder (top) and its equivalent electrical circuit (bottom) in accordance with the invention.

The transponder consists of a photo diode that is matched to an antenna. A schematic layout of the transponder is shown in FIG. 7 top with its equivalent electrical circuit at the bottom of FIG. 7.

The absorbed photons in the photo diode create electron-hole-pairs in the diode. The procedure can be described with a current generator, whose current as a function of the absorbed light power $P_L$ is given as $$I_L = P_L R_\lambda, \tag{4.1}$$

where $R_\lambda$ is the responsivity (typically ~0.5 A/W) of the diode. The diode current is given as $$I_D = I_{sat}\left(e^{\frac{eV_D}{\eta kT}} - 1\right), \tag{4.2}$$

where η is the ideality factor, $k=1.38\cdot10^{-23}$ J/K is the Boltzmann's constant, T is the temperature, $e=1.60\cdot10^{-19}$ C is the elementary charge, $I_{sat}$ is the saturation current, and $V_D$ is the voltage over the diode. Let us assume that the shunt and load resistances, $R_{sh}$ and $Z_L$ (in FIG. 7) are very large. Then, the current through the diode equals the current produced by the absorbed light and the voltage across the diode can be written as $$V_D = \frac{\eta kT}{e}\ln\left(\frac{P_L R_\lambda + I_{sat}}{I_{sat}}\right). \tag{4.3}$$

The voltage affects both the junction resistance and capacitance. The small-signal junction resistance of the diode is $$r_j = \frac{1}{dV/dI} = \frac{\eta kT}{eI_{sat}}e^{\frac{eV_D}{\eta kT}}. \tag{4.4}$$

The junction capacitance is given as $$C_j = \frac{C_{j0}}{\left(1 - \frac{V_D}{\Phi_i}\right)^\gamma}, \tag{4.5}$$

where $\Phi_i$ is the junction potential and γ is the profile parameter for the depletion capacitance and is 0.5 for a uniformly doped junction.

Electromagnetic Detection Distance

The impedance of the diode (FIG. 7) seen from the load is $$Z_D = R_s + \frac{r_j R_{sh}}{R_{sh} + r_j + j\omega r_j R_{sh} C_j}. \tag{4.6}$$

The junction resistance is very large at relatively low irradiance levels and can be assumed infinite. For example, the junction resistance of BPV10 photo diode chip (Vishay Semiconductors) is 25 MΩ in dark conditions and 5.8 kΩ with 1 mW/cm² irradiance. In addition, the shunt resistance is typically on the order of MΩ and can be neglected. Equation (4.6) becomes $$Z_D \approx R_s + \frac{1}{j\omega C_j}. \tag{4.7}$$

The diode is illuminated with a modulated light source and its load impedance is infinite at DC. The modulated light changes the forward bias of the diode and modifies its junction capacitance. The alternating junction capacitance causes modulated backscatter. The conversion efficiency of the transponder is $$E = |\Delta\rho|^2 = \left|\frac{\Delta C_j}{2\omega R_s C_{j0}^2}\right|^2, \quad (4.8)$$

where $\Delta C_j = C_{j,max} - C_{j0}$. The microwave detection distance of the transponder is given by (3.12).

Tracking Resolution and Speed

The tracking resolution is limited by the beam width of the scanning laser. In practice the laser beam width can be millimeters.

The tracking speed depends on the resolution bandwidth of the receiver $B_{res}$ which is limited by the modulation frequency of the laser $f_m$. Requiring that $B_{res} < f_m/10$, the measurement (refreshment) rate is $f_m/10$. For example, assuming that the tracking space is divided into 10 000 cells, and that two lasers, whose modulation frequency is 1 MHz, are used for tracking yields a refreshment rate of 5 Hz (insect position is updated 5 times/second).

Identification of Multiple Targets

Multiple target identification can be realized using optical wavelength division, electromagnetic frequency division, or both. Optical wavelength division is realized using photo diodes that are sensitive to different wavelengths. The optical wavelength division may require optical filters and could enable three different wavelength bands. The electromagnetic frequency division is realized using transponder antennas that are matched at different frequencies. Electromagnetic frequency division could also allow three different frequency bands such that the total number of identifiable transponders could be 9.

Estimation of Realizable Performance

Let us assume that the irradiance of the laser is 1 mW/cm². This irradiance level should be safe in normal use. The safety can be further increased by using 1400 nm wavelength that is safer for human eyes.

The transponder could be based on a BPV10 photo diode chip from Vishay Semiconductor whose parameters are shown in Table II.

TABLE II

Parameters of the BPV10 photo diode chip from Vishay Semiconductors.

| Sensitivity | $R_\lambda = 0.55$ A/W |
|---|---|
| Junction capacitance at zero bias | $C_{j0} = 11$ pF |
| Series resistance | $R_s = 12\Omega$ |
| Saturation current in dark | $I_{sat, d} = 1$ nA |
| Saturation current in light (1 mW/cm²) | $I_{sat, l} = 70$ μA |
| Junction potential | $\Phi_j = 1$ V |
| Shunt resistance[1] | $R_{sh} = 1$ GΩ |
| Radiant sensitive area | $A = 0.78$ mm² |
| Size of the diode[1] | 1 mm × 1 mm × 0.2 mm |
| Mass of the diode[1] | 0.5 mg |

[1]Estimated

Figure 8:
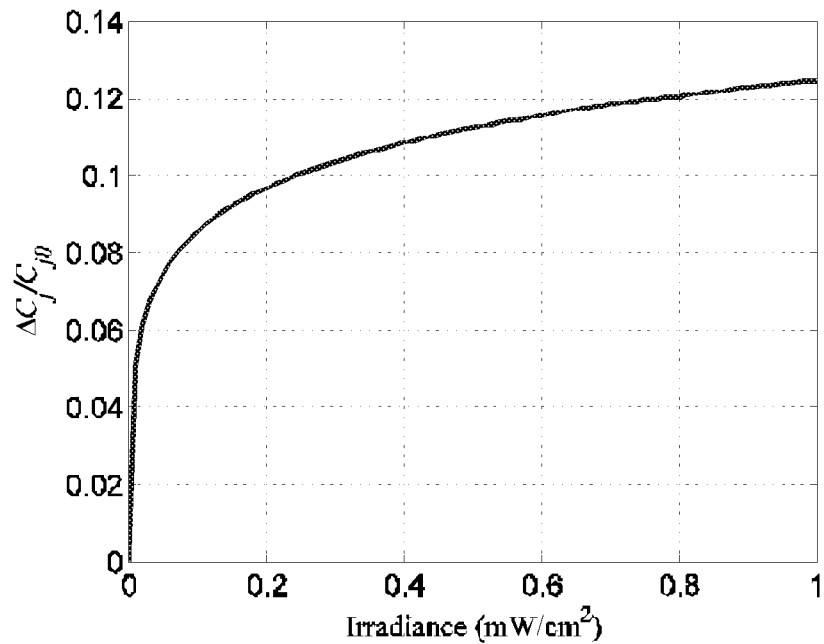
FIG. 8 presents graphically relative change in the junction capacitance as a function of the irradiance in accordance with the invention.

The junction capacitance as a function of irradiance is shown in FIG. 8.

Figure 9:
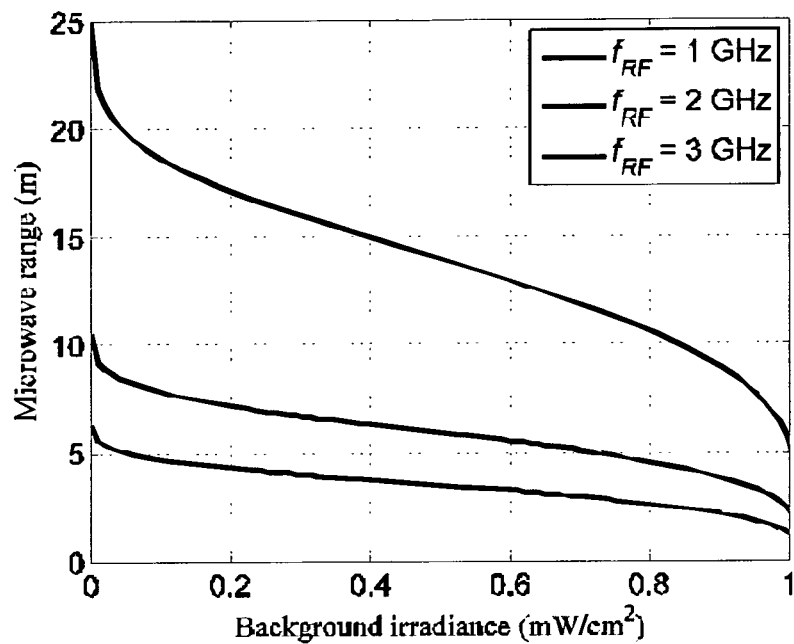
FIG. 9 presents graphically microwave detection range of photo diode based transponder at different background irradiance levels in accordance with the invention.

The modulation efficiency depends on the background irradiance level. The microwave detection range of the transponder at different background irradiance levels is shown in FIG. 9. The microwave link budget parameters equal those presented in Table I. For example, the transponder could be detected from a 10 m distance at 1 GHz with a 0.8 mW/cm² background irradiance level. A typical luminance level in office is 500 lx, which could correspond to approximately 0.1 mW/cm² irradiance depending on the used spectrum.

Figure 10:
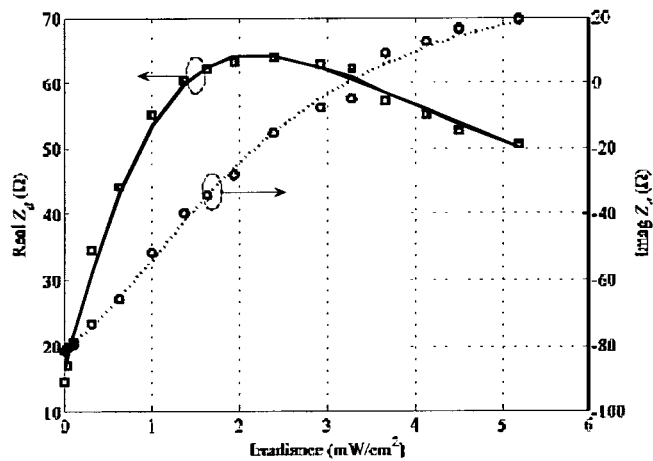
FIG. 10 presents graphically the measured (marker) and calculated (line) impedance of the photo diode at 1.5 GHz as a function of irradiance in accordance with the invention.

The measured real and imaginary parts of the diode impedance at different irradiance levels at 1.5 GHz are shown in FIG. 10 with the calculated curves. The diode ideality factor is assumed to be η=1 and the junction profile parameter γ=0.5 in the calculation.

The calculated and measured impedances agree well and show that the simple model of the photo diode in FIG. 7 can be used for designing a wireless photo detector. FIG. 10 also shows that very strong modulation is achieved at relatively low irradiance levels. Therefore, even a low power class I-laser scanner, whose laser power is limited to 1 mW, could be used for locating the target.

Figure 11:
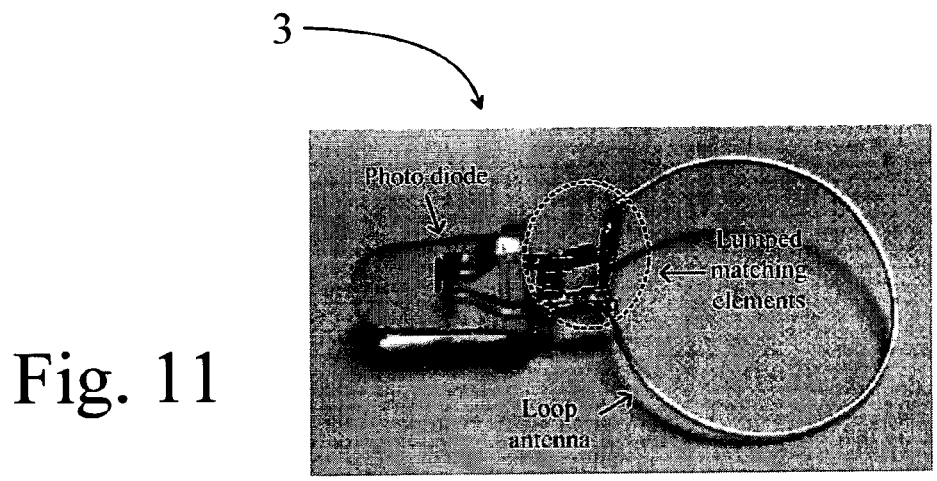
FIG. 11 presents a photograph of the photo-activated microwave transponder in accordance with the invention.

A photograph of the transponder is shown in FIG. 11. A packaged photo diode is used in this experiment due to poor availability of bare diode chips. A bare photo diode chip with an antenna optimized for low mass would enable a lightweight and small transponder. For example, a 1 mm×1 mm×0.2 mm size silicon diode chip weighs approximately 0.5 mg. Similarly, the loop antenna could be manufactured of 0.1 mm thick copper wire and matched directly to the diode without lumped elements. Such antenna with equal loop size to that used in the measurements would weigh 3 mg providing a transponder weight comparable to that of typical harmonic radar transponders (3 mg) [11]. Further size and mass reductions of the transponder could be achieved by using higher microwave frequencies for interrogation. This, however, could necessitate a smaller effective photo diode area and thus stronger laser illumination.

Figure 12:
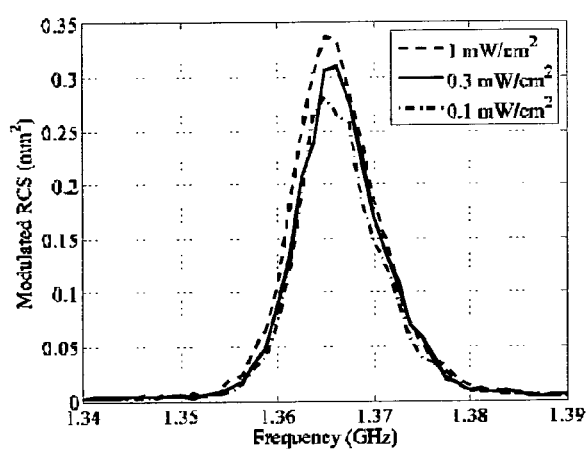
FIG. 12 presents graphically measured modulated radar cross section (RCS) of the transponder. The curves are for different irradiance levels.

FIG. 12 shows that sufficient modulation occurs at irradiance levels as low as 0.1 mW/cm². If using a bare diode chip instead of a packaged photo diode, the irradiance level should be 20 times higher and a class I-laser (1 mW power) could be used to produce spots up to 7×7 mm in size. Further, assuming that a laser scanner with a 1 kHz scanning rate (which is typical for commercially available scanners) was used with 7×7 mm spot, 0.5 m² area could be scanned in a second.

As a summary the invention relates to method and system for object localization. In the method an object 1, typically an insect is illuminated by at least one first type of signal, and response of the signal is detected, the object 1 equipped with a transponder 2, 3 backscattering the first type of signal, the transponder 2, 3 is illuminated also by a second type of signal affecting to the backscattering frequency of the transponder 2, 3, and the backscattered signal from the transponder 2, 3 is detected in order to localize the object.

In an advantageous solution of the invention the transponder 2, 3 is illuminated by ultrasound or light as a second type of signal.

In another advantageous solution of the invention the first type of signal is microwave signal.

In another advantageous solution of the invention at least essentially continuous signal with multiple transmitters is used for second type of illumination.

In another advantageous solution of the invention a pulsed signal source 14' is used for second type of illumination.

In another advantageous solution of the invention the method is used for localization or tracking of insects.

In another advantageous solution of the invention the method is used for localization or tracking of humans.

In another advantageous solution of the invention the method is used for localization or tracking of vehicles.

REFERENCES

[1] D. R. Reynolds and J. R. Riley, "Remote-sensing, telemetric and computer-based technologies for investigating insect movement: a survey of existing and potential techniques," *Computers and Electronics in Agriculture*, Vol. 35, pp. 271-307, 2002.

[2] H. Staras and J. Shefer, Harmonic Radar Detecting and Ranging System for Automotive Vehicles, U.S. Pat. No. 3,781,879, 1972.

[3] E. A. Capaldi, A. D. Smith, J. L. Osborne, S. E. Fahrbach, S. M. Farris, D. R. Reynolds, A. S. Edwards, A. Martin, G. E. Robinson, G. M. Poppy, and J. R. Riley, "Ontogeny of orientation flight in the honeybee revealed by harmonic radar," *Nature*, vol. 403, pp. 537-540, 2000.

[4] J. R. Riley, A. D. Smith, D. R. Reynolds, A. S. Edwards, J. L. Osborne, I. H. Williams, N. L. Carreck, and G. M. Poppy, "Tracking bees with harmonic radar," *Nature*, vol. 379, pp. 29-30, 1996.

[5] J. L. Osborne, S. J. Clark, R. J. Morris, I. H. Williams, J. R. Riley, A. D. Smith, D. R. Reynolds, and A. S. Edwards, "A landscape-scale study of bumblebee foraging range and constancy, using harmonic radar," *Journal of Applied Ecology*, vol. 36, pp. 519-533, 1999.

[6] E. T. Cant, A. D. Smith, D. R. Reynolds and J. L. Osborne, "Tracking butterfly flight paths across the landscape with harmonic radar," *Proceedings of the Royal Society B: Biological Sciences*, vol. 272, no. 1565, pp. 785-790, April 2005.

[7] O. Ovaskainen, A. D. Smith, J. L. Osborne, D. R. Reynolds, N. L. Carreck, A. P. Martin, K. Niitepold, and I. Hanski, "Tracking butterfly movements with harmonic radar reveals an effect of population age on movement distance," *Proceedings of the National Academy of Sciences*, vol. 105, no. 49, pp. 19090-19095, December 2008.

[8] G. P. Svensson, P. G. Valeur, D. R. Reynolds, A. D. Smith, J. R. Riley, T. C. Baker, G. M. Poppy, and C. Löfstedt, "Mating disruption in Agrotis segetum monitored by harmonic radar," *Entomologia Experimentalis et Applicata*, vol. 101, pp. 111-121, 2001.

[9] G. L. Lövei, I. A. N. Stringer, C. D. Devine, and M. Cartellieri, "Harmonic radar—a method using inexpensive tags to study invertebrate movement on land," *New Zealand Journal of Ecology*, vol. 21, no. 2, pp. 187-193, 1997.

[10] R. D. Brazee, E. S. Miller, M. E. Reding, M. G. Klein, B. Nudd, and H. Zhu, "A transponder for harmonic radar tracking of the black vine weevil in behavioral research," *Amer. Soc. Agricult. Eng. Trans.*, vol. 48, no. 2, pp. 831-838, 2005.

[11] J. R. Riley and A. D. Smith, "Design considerations for an harmonic radar to investigate the flight of insects at low altitude," *Computers and Electronics in Agriculture*. Amsterdam, The Netherlands: Elsevier, 2002, Vol. 35, pp. 151-169.

[12] E. T. Cant, A. D. Smith, D. R. Reynold and J. L. Osborne, "Tracing butterfly flight paths across the landscape with harmonic radar," *Proceedings of the Royal Society B: Biological Sciences*, Vol. 272, No. 1565, pp. 785-790, April 2005.

[13] B. G. Colpitts and G. Boiteau, "Harmonic radar transceiver design: Miniature tags for insect tracking," *IEEE Transactions on Antennas and Propagation*, Vol. 52, No. 11, pp. 2825-2832, November 2004.

[14] D. E. N. Davies and R. J. Klensch, "Two-frequency secondary radar incorporating passive transponders," *IEE Electronics Letters*, Vol. 9, No. 25, pp. 592-593, December 1973.

[15] H. Kwun, G. L. Burkhardt, J. L. Fisher, Detection of reinforcing steel corrosion in concrete structures using non-linear harmonic and intermodulation wave generation, U.S. Pat. No. 5,180,969, 1993.

[16] V. Viikari, J. Saebboe, S. Cheng, M. Kantanen, M. Al-Nuaimi, T. Varpula, A. Lamminen, P. Hallbjorner, A. Alastalo, T. Mattila, H. Seppä, P. Pursula, and A. Rydberg, "Technical solutions for automotive intermodulation radar for detecting vulnerable road users," *Proceedings of the IEEE 69th Vehicular Technology Conference*, Barcelona, Spain, Apr. 26-29, 2009.

[17] V. Viikari, H. Seppä, T. Mattila, and A. Alastalo, "Wireless ferroelectric resonating sensor," submitted to *IEEE Transactions on Ultrasonics, Ferroelectrics and Frequency Control*, 2009.

[18] V. Viikari and H. Seppä, "Wireless MEMS Sensor Concept Based on Intermodulation Distortion," accepted with minor revision to *IEEE Sensors Journal*, 2009.

[19] D. Psychoudakis, W. Moulder, C. Chi-Chih, Z. Heping, and J. L. Volakis, "A portable low-power harmonic radar system and conformal tag for insect tracking," *IEEE Antennas and Wireless Propagation Letters*, vol. 7, pp. 444-447, 2008.

[20] http://www.recco.com/

[21] J. Roland, G. McKinnon, C. Backhouse, and P. D. Taylor, "Even smaller radar tags on insects," *Nature*, Vol. 381, p. 120, May 1996.

[22] D. Mascanzoni and H. Wallin, "The harmonic radar: a new method of tracing insects in the field," *Ecological Entomology*, Vol. 11, pp. 387-390, 1986.

[23] http://www.massa.com/datasheets/E-188-220%20Datasheet%20090427.pdf

The invention claimed is:

1. A method for object localization comprising the steps of:
   illuminating an object by at least one first type of signal,
   detecting a response of the signal,
   wherein the object is equipped with a transponder for backscattering the first type of signal,
   illuminating the transponder by a second type of signal that modifies a backscattering frequency of the transponder, and
   detecting the backscattered signal from the transponder, the backscattered signal being associated with the second type of signal and having a modified backscattering frequency, the backscattered signal from the transponder being used in order to localize the object.

2. A method in accordance with claim 1, wherein the transponder is illuminated by ultrasound as the second type of signal.

3. A method in accordance with claim 1, wherein the transponder is illuminated by light as the second type of signal.

4. A method in accordance with claim 1, wherein the first type of signal is a microwave signal.

5. A method in accordance with claim 1, wherein at least an essentially continuous signal with multiple transmitters is used for the second type of illumination.

6. A method in accordance with claim 1, wherein a pulsed signal source is used for the second type of illumination.

7. A method in accordance with claim 1, wherein the object is an insect.

8. A method in accordance with claim 1, wherein the object is a human.

9. A method in accordance with claim 1, wherein the object is a vehicle.

10. A system fir object localization which comprises;
    a first illuminating means for illuminating an object by at least one type of signal,
    a detection means for detecting a response of the first type of signal, a transponder attached to the object, the transponder backscattering the first type of signal and also being sensitive to another type of signal such that it affects the frequency backscattered from the transponder, a second illuminating means for illuminating the transponder by a second type of signal that modifies a backscattering frequency of the transponder, and a detection means for detecting the backscattered signal from the transponder, the backscattered signal being associated with the second type of signal and having a modified backscattering frequency, the backscattered signal from the transponder being used in order to localize the object.

11. A system in accordance with claim 10, wherein the second illuminating means is at least one ultrasound transmitter.

12. A system in accordance with claim 10, wherein the detecting means is at least one microwave receiver.

13. A system in accordance with claim 10, wherein the second illuminating means is at least one continuous transmitter.

14. A system in accordance with claim 10, wherein the second illuminating means is at least one pulsed transmitter.

15. A system in accordance with claim 10, wherein the transponder is attachable to an insect.

16. A system in accordance with claim 10, wherein the transponder is a capacitive ultrasound transponder equipped with an antenna for microwave backscattering.

17. A system in accordance with claim 10, wherein the transponder is a photodiode equipped with an antenna for microwave backscattering.

* * * * *